United States Patent

[11] 3,628,124

| [72] | Inventor | Arne Johansson<br>Grangesberg, Sweden |
|---|---|---|
| [21] | Appl. No. | 79,454 |
| [22] | Filed | Oct. 9, 1970 |
| [45] | Patented | Dec. 14, 1971 |
| [73] | Assignee | Allmanna Svenska Elektriska Aktiebolaget<br>Vasteras, Sweden |
| [32] | Priority | Oct. 10, 1969 |
| [33] | | Sweden |
| [31] | | 13917/69 |

[54] VARIABLE OVERVOLTAGE PROTECTION MEANS FOR DC NETWORKS
3 Claims, 1 Drawing Fig.

[52] U.S. Cl. .................................................... 321/14,
317/61, 321/4, 321/27
[51] Int. Cl. ...................................................... H02m 1/18,
H02h 7/12
[50] Field of Search ........................................... 321/11–14,
27, 4; 317/61, 61.5; 315/36

[56] References Cited
UNITED STATES PATENTS

| 2,585,796 | 2/1952 | Lamm .......................... | 321/13 |
| 3,339,112 | 8/1967 | Lee et al. ..................... | 315/36 |
| 3,531,710 | 9/1970 | Brever et al. ................. | 321/14 |

FOREIGN PATENTS

| 1,539,445 | 8/1968 | France ......................... | 317/61 |

Primary Examiner—William H. Beha, Jr.
Attorney—Jennings Bailey, Jr.

ABSTRACT: An overvoltage protection device for a DC transmission line connecting two stations, each station including several series-connected converters each provided with a bypass member, has a series of lightning arrester units connected between the transmission line and earth. At least all but one of the lightning arresters has a bypass device. Relays for closing the bypass devices to short circuit the lightning arresters are connected to the bypass members for the converters in such a way that the number of bypassed lightning arresters corresponds to the number of bypassed converters.

Patented Dec. 14, 1971
3,628,124
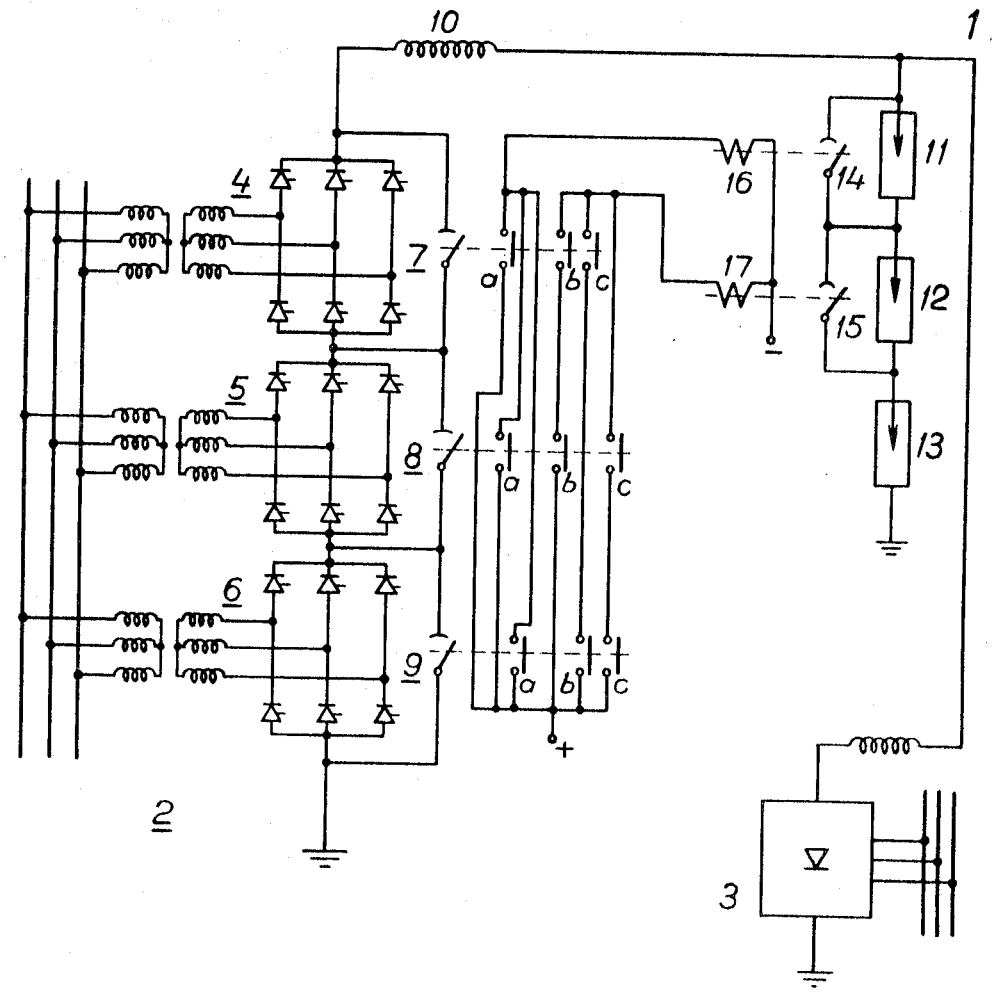

VARIABLE OVERVOLTAGE PROTECTION MEANS FOR DC NETWORKS

BACKGROUND OF THE INVENTION

Field of the Invention

The present invention relates to overvoltage protection means for a DC transmission line connecting two converter stations, each of which comprises a number of series-connected converters each provided with a bypass member, the DC transmission line being connected to each station by way of a DC reactor.

SUMMARY OF THE INVENTION

The overvoltage protection means is based on the lightning arrester principle and is characterized in that in each station it comprises a number of series-connected lightning arrester units connected outside the DC reactor between the DC transmission line and earth, the arrester units being provided with bypass members controlled from the bypass members of the converters in such a way that the number of series-connected active arrester units always corresponds to the number of series-connected converters in operation, that is, that the protection level of the overvoltage protection means is constantly adjusted to the voltage strength of the converter station. Since the lightning arresters are arranged outside the DC reactor, this will isolate any overvoltages on the DC line from the converter station itself, since the arresters are so located that they come into operation before the overvoltage becomes noticeable on the other side of the reactor, that is, inside the station. This is of particular importance when the converters are built up of semiconductor rectifiers which are extremely sensitive to overvoltages. It has therefore previously been necessary to arrange strong overvoltage protection means for each converter in the station and also for the separate rectifiers. According to the invention, however, these internal overvoltage protection means are considerably simplified, thus resulting in a decrease in the protection level realizable in practice. Furthermore, the advantage is gained that the DC reactor considerably reduces the likelihood of overvoltages on the converter side. Both these factors contribute to a decrease in the insulation of the station and costs for protection means.

However, in order to achieve this saving in insulation and protective apparatus inside the station, the protection level of the transmission line must be constantly adapted to the transmission voltage. According to the invention this is achieved by connecting the bypass members for converters and arrester units so that the number of these components is constantly adjusted in each station to fit each other. In this way the protective level for the separate converter will be independent of the number of converters connected.

BRIEF DESCRIPTION OF THE DRAWING

The invention will be further described with reference to the accompanying drawing which shows a DC power transmission line having overvoltage protection means according to the invention.

DESCRIPTION OF THE PREFERRED EMBODIMENTS

The drawing shows a DC power transmission line 1 connecting two converter stations 2 and 3, only station 2 being shown in detail, since the stations are in principle constructed in the same manner, one being a rectifier station and the other an inverter station.

The station 2 comprises three series-connected converters 4, 5, 6 which are connected over a smoothing reactor 10 to the DC transmission line 1. Each converter comprises a converter transformer and a rectifier bridge, parallel to which are bypass members 7, 8, 9, respectively. Each of these bypass members is provided with three auxiliary contacts $a, b, c$.

Outside the DC reactor 10, between the DC transmission line and earth, are three series-connected arrester elements 11, 12, 13 in the form of lightning arresters of known type. The two upper lightning arresters 11 and 12 are connected in parallel with bypass members 14, 15 respectively. For example isolators controlled by relays 16 and 17, respectively. These relays are controlled by the contacts $a, b, c$ on the bypass members of the rectifier bridges.

The relay 16 is controlled by three parallel-connected contacts $7a, 8a, 9a$, one from each of the isolators 7, 8 and 9, whereas the relay 17 is controlled by three parallel-connected pairs of series contacts $7b$ and $8b$, $7c$ and $9b$, $8c$ and $9c$. This means that if one of the converters is bypassed the arrester 11 will be bypassed and if two converters are bypassed, the arrester 12 will also be bypassed. In this way the number of series-connected arrester elements always corresponds to the number of series-connected converters so that the protection level and insulation level always agree.

The third arrester 13 is not provided with any bypass member since if all three converters were bypassed the system would simply be put out of operation. Instead of the connection of the two groups of bypass members shown, it is simply possible to let each isolator 7, 8, 9 control, over the contact "$a$," a corresponding bypass member for the arrester element. Contacts $b$ and $c$ are then unnecessary. However, on the other hand there must also be a bypass member for the arrester 13 and such a bypass member must be in the form of an isolator and is considerably more expensive than the auxiliary contacts $a, b, c$.

The arrester units 11, 12, 13 may be of conventional type consisting of a spark gap pile in series with voltage-dependent resistors. The spark gaps should be designed with some form of blowing mechanism in order to be able to extinguish direct currents and the units should be parallel connected with highohmic voltage dividers in order to ensure the voltage distribution between them.

We claim:

1. Overvoltage protection means for a DC transmission line connecting two converter stations, each of which comprises a plurality of series-connected converters each provided with a bypass member, a DC reactor connecting the DC transmission line to each station, the overvoltage protection means in each station comprising a plurality of series-connected lightning arrester units connected outside the DC reactor between the DC transmission line and earth, the protection level of the overvoltage protection means corresponding to the voltage strength of the stations, bypass means connected with at least some of the arrester units, means responsive to operation of the bypass members of the converters to control said bypass means to keep the number of series-connected, active arrester units proportional to the number of series-connected converters, whereby the relationship between the protection level and the voltage strength is substantially independent of the number of converters in operation.

2. Overvoltage protection means according to claim 1, in which each lightning arrester unit is provided with a bypass means controlled by a corresponding bypass member for a converter in the same station.

3. Overvoltage protection means according to claim 1, in which each lightning arrester unit except one is provided with a bypass means, and said control means comprises a common control device for all arrester units in the station which operates in response to the number of converters connected in the station.

* * * * *